United States Patent [19]

Sipos

[11] Patent Number: 5,274,620

[45] Date of Patent: Dec. 28, 1993

[54] COMPACT DISC HANDLING MECHANISM

[75] Inventor: Laszlo Sipos, Saratoga, Calif.

[73] Assignee: Kubik Enterprises, Inc., Saratoga, Calif.

[21] Appl. No.: 806,719

[22] Filed: Dec. 12, 1991

[51] Int. Cl.⁵ ............................................. G11B 33/02
[52] U.S. Cl. ................................... 369/77.2; 369/36; 369/192; 360/99.06
[58] Field of Search .............. 369/77.2, 36, 291, 77.1, 369/38, 191, 39, 192; 360/99.06, 99.07

[56] References Cited

U.S. PATENT DOCUMENTS

| | | | |
|---|---|---|---|
| 3,131,936 | 5/1964 | Hagen | 369/39 |
| 3,873,100 | 3/1975 | Omiya et al. | 369/77.2 |
| 4,063,286 | 12/1977 | Takahara et al. | 369/191 |
| 4,589,101 | 5/1986 | Schatteman et al. | 369/38 |
| 4,614,474 | 9/1986 | Sudo | 369/191 |
| 4,695,990 | 9/1987 | Kawakami | 369/38 |
| 4,701,900 | 10/1987 | Hasegawa et al. | 369/36 |
| 4,742,504 | 5/1988 | Takasuka et al. | 369/77.2 |
| 4,996,680 | 2/1991 | Staar | 369/36 |
| 5,031,164 | 7/1991 | Rockola et al. | 369/37 |
| 5,136,562 | 8/1992 | Staar | 369/36 |

*Primary Examiner*—John H. Wolff
*Assistant Examiner*—David Davis
*Attorney, Agent, or Firm*—Limbach & Limbach

[57] ABSTRACT

A disc handling mechanism is disclosed that transfers a disc between a multi-disc storage rack and a cartridge-type disc player. The disc handling mechanism includes a dedicated cartridge that moves between the storage rack and the disc player, plus mechanisms for transferring the disc between the storage rack and the cartridge. The invention includes a cartridge transfer mechanism for moving the cartridge between a first position adjacent the storage rack and a second position adjacent the player, disc feed mechanism for transferring a disc from the storage rack to the cartridge, and disc extraction mechanism for transferring the disc from the cartridge to the storage rack.

16 Claims, 11 Drawing Sheets

COMPACT DISC HANDLING MECHANISM

BACKGROUND OF THE INVENTION

1. Field of the Invention

This invention relates generally to digital data storage apparatus, and relates more particularly to an improved compact disc handling mechanism for transferring a compact disc to a cartridge for insertion into a player.

2. Description of the Relevant Art

One form of storing digital data is optically based, in which digital data is stored on and retrieved from a data disc in an optically discernible form using a laser read/write head. In use today are optically based disc systems for use as digital storage devices for computers. These storage devices are known as CD ROM devices, where "CD ROM" stands for compact disc read-only memory.

Some CD ROM devices house the disc in a cartridge for protection. When the cartridge is inserted into a disc player, the player loads the disc onto a spindle and rotates the disc so that a laser read/write head can access the data stored on the disc. One type of disc player includes an automatic loading mechanism that senses when the cartridge has been partially inserted into a slot in the player and then automatically moves the cartridge the rest of the way into the player. This type of player ejects a cartridge by moving the cartridge to the partially inserted position with about one inch of the cartridge protruding from the player.

Cartridge-based discs are fine for applications where only a few discs are needed and they can be loaded into the player manually. Where an automatic, multiple disc capability is desired, however, the larger size and added mass of the cartridge causes problems. Significantly more space is required to store discs in cartridges than is required for discs alone since the cartridges are larger than the discs themselves. The added mass of the cartridges is another problem since more force is required to move a group of cartridges than an equal number of discs alone.

It would be desireable to use a multiple disc changer apparatus for handling discs, such as those as disclosed in applicant's U.S. Pat. Nos. 4,750,160 and 4,815,057. There, discs without cartridges are stored on a round carousel and are loaded onto a player by a disc handling mechanism. A drawback to this type of changer is that cartridge-based players cannot be used without modification.

SUMMARY OF THE INVENTION

The present invention provides a disc handling mechanism that transfers a disc between a multi-disc storage rack and a cartridge-type disc player. The disc handling mechanism includes a dedicated cartridge that moves between the storage rack and the disc player, plus mechanisms for transferring the disc between the storage rack and the cartridge. The invention includes a cartridge transfer mechanism for moving the cartridge between a first position adjacent the storage rack and a second position adjacent the player, disc feed mechanism for transferring a disc from the storage rack to the cartridge, and disc extraction mechanism for transferring the disc from the cartridge to the storage rack.

Discs are stored on the storage rack without associated cartridges. A disc stored in the storage rack is loaded into the disc player by first positioning the disc adjacent the disc handling mechanism, and then loading the disc into the cartridge and moving the cartridge into the disc player. The disc player accepts the cartridge and disc contained therein and loads them onto its spindle.

In the preferred embodiment, a rotary arm cam mechanism actuates all three functions of the disc handling mechanism, namely disc feed, cartridge transfer, and disc extraction. The rotary arm cam intermittently rotates in alternating directions, actuating either a load or unload operation, depending on the direction of rotation. During a forward rotation of the rotary arm cam, the cam actuates the disc feed mechanism through a scissors mechanism that pivots a feeder arm to advance a disc into the cartridge, then engages a slot in the cartridge and loads the cartridge into the player, and then disengages the cartridge and raises the feeder arm so that the storage rack can be repositioned. During a reverse rotation of the rotary arm cam, the cam engages the slot in the cartridge and moves the cartridge back to the storage rack, and then engages an extraction arm within the cartridge, which rolls the disc out of the cartridge and onto the storage rack.

The disc handling mechanism of the present invention has the advantage that no cartridges are stored on the storage rack, which reduces weight and size. Only a single cartridge is needed for each disc player. A further advantage is that no modification of the disc player is needed in order to adapt it to automatic disc loading.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIGS. 5-8 are a sequence of side views of the disc handling mechanism illustrating the transfer of a disc from a storage rack to a disc player.

FIGS. 9-11 are a sequence of side views of the disc handling mechanism illustrating the transfer of a disc from the cartridge to the storage rack.

DETAILED DESCRIPTION OF THE PREFERRED EMBODIMENT

FIGS. 1 through 11 of the drawings depict various embodiments of the present invention for purposes of illustration only. One skilled in the art will readily recognize from the following discussion that alternative embodiments of the structures and methods illustrated herein may be employed without departing from the principles of the invention described herein.

Figure 1:
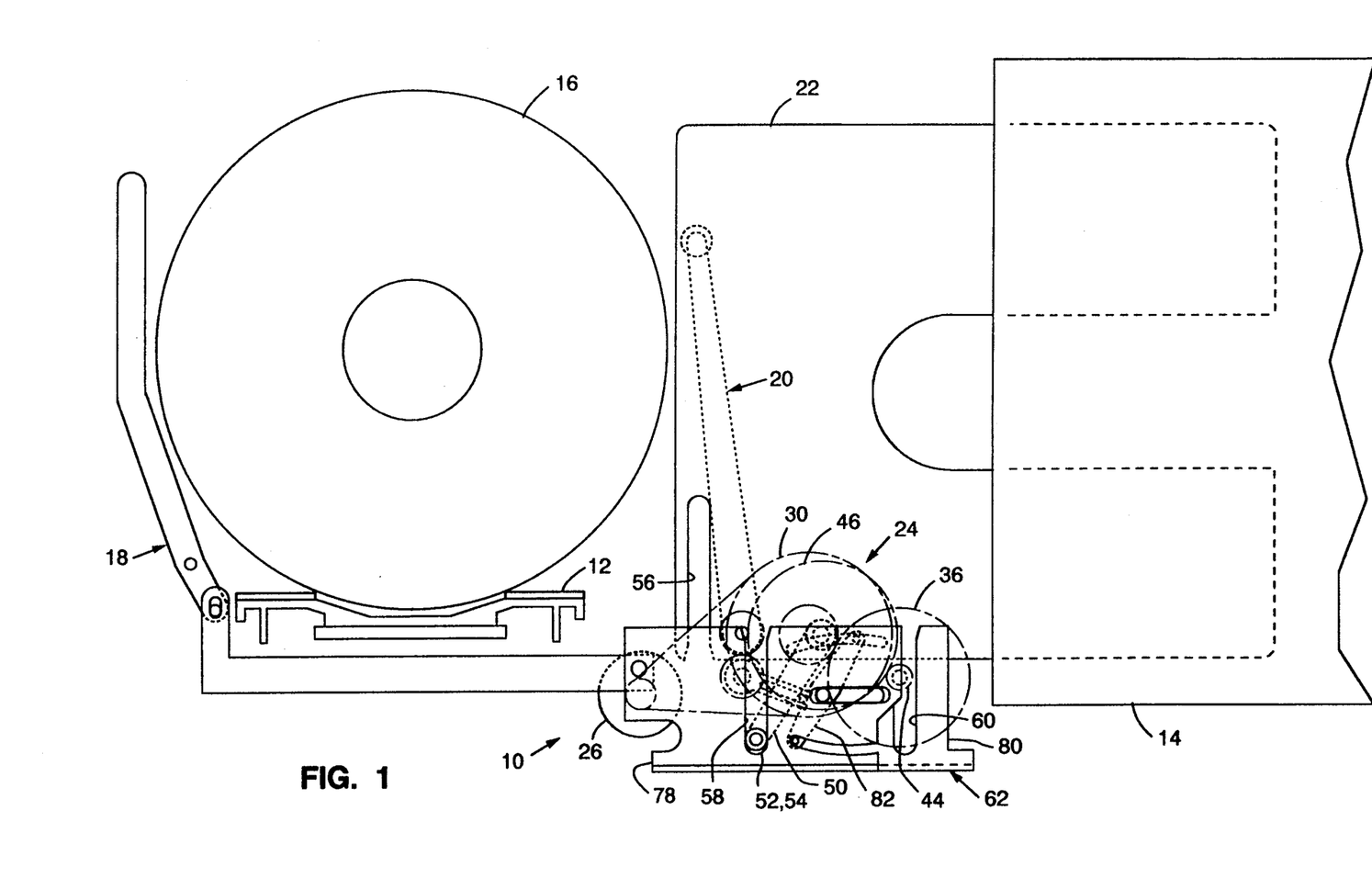
FIG. 1 is a side view of an automatic disc changer apparatus with a disc handling mechanism according to the present invention.

As shown in FIG. 1, an automatic disc changer apparatus that incorporates the disc handling mechanism 10 of the present invention includes a storage rack 12 and a disc player 14. One or more discs 16 are stored on the storage rack 12, which can be a circular carousel as shown in applicant's U.S. Pat. Nos. 4,750,160 and 4,815,057, or can be a linear rack. Associated with the storage rack 12 are means (not shown) for moving the storage rack to position a selected disc adjacent the disc handling mechanism. The disc handling mechanism 10, which transports a disc 16 between the storage rack 12 and the disc player 14, generally includes a disc feed mechanism 18, a disc extraction mechanism 20, a cartridge 22, and a rotary arm cam mechanism 24 for actuating the other mechanisms. Since the rotary arm cam mechanism 24 provides the motive force for actuating the other mechanism, the cam will be explained next, followed by explanations of the other mechanisms.

Figure 2:
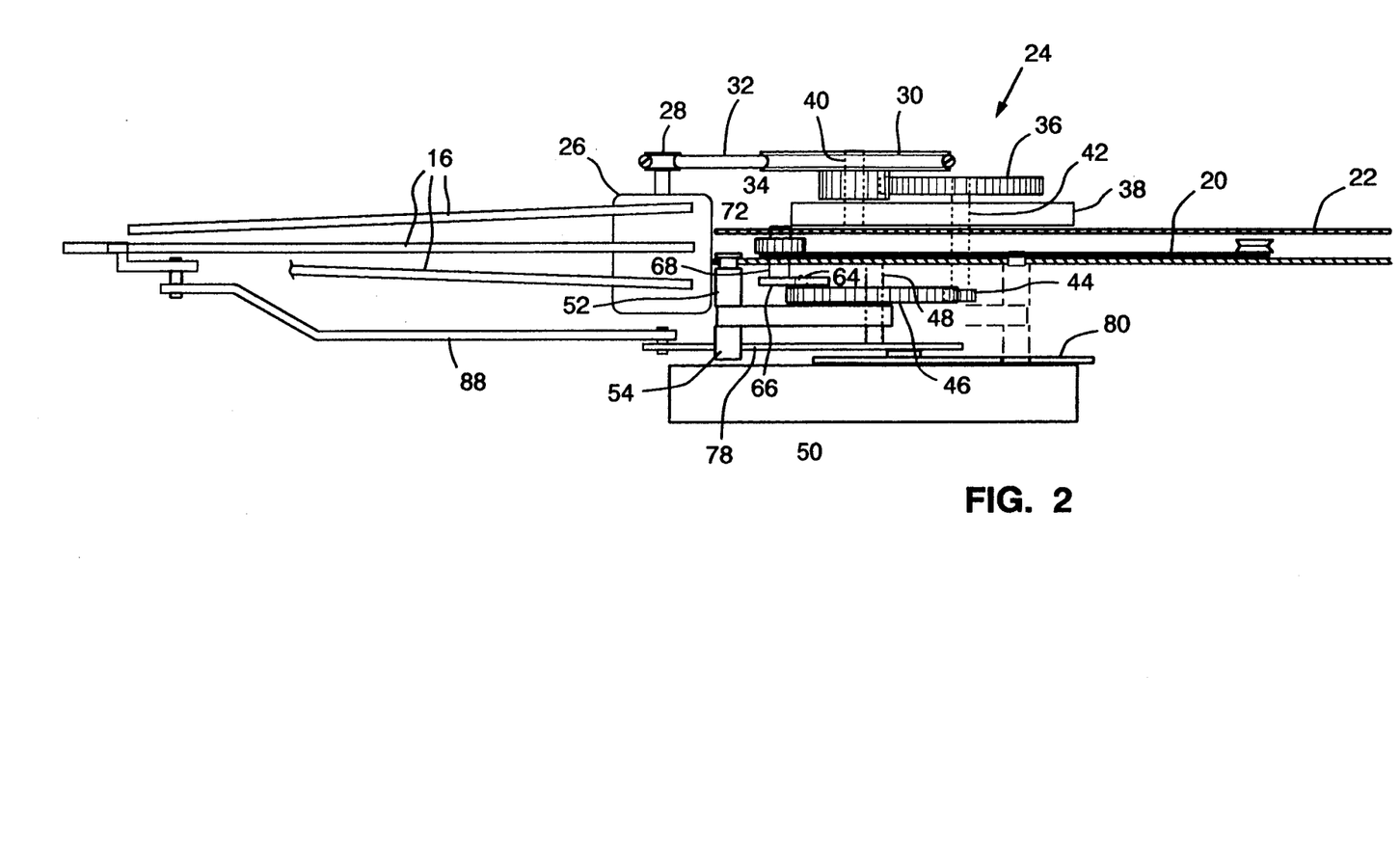
FIG. 2 is a top plan view of the disc handling mechanism of the present invention.
Figure 3:
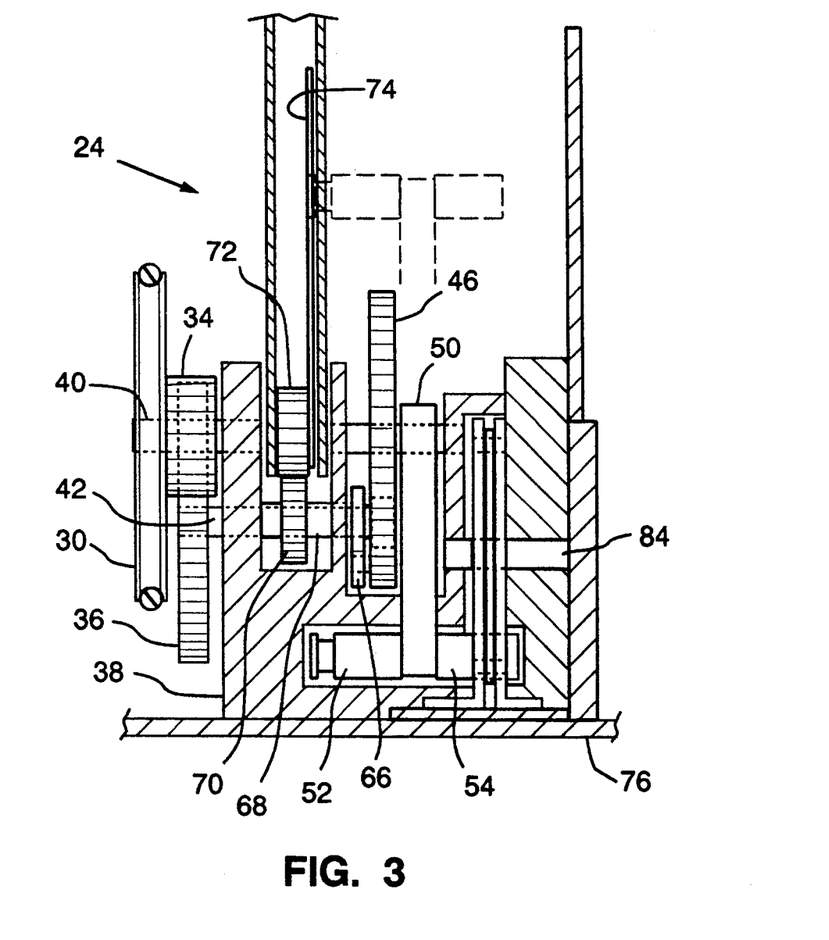
FIG. 3 is a sectional view of the disc handling mechanism of the present invention.
Figure 4:
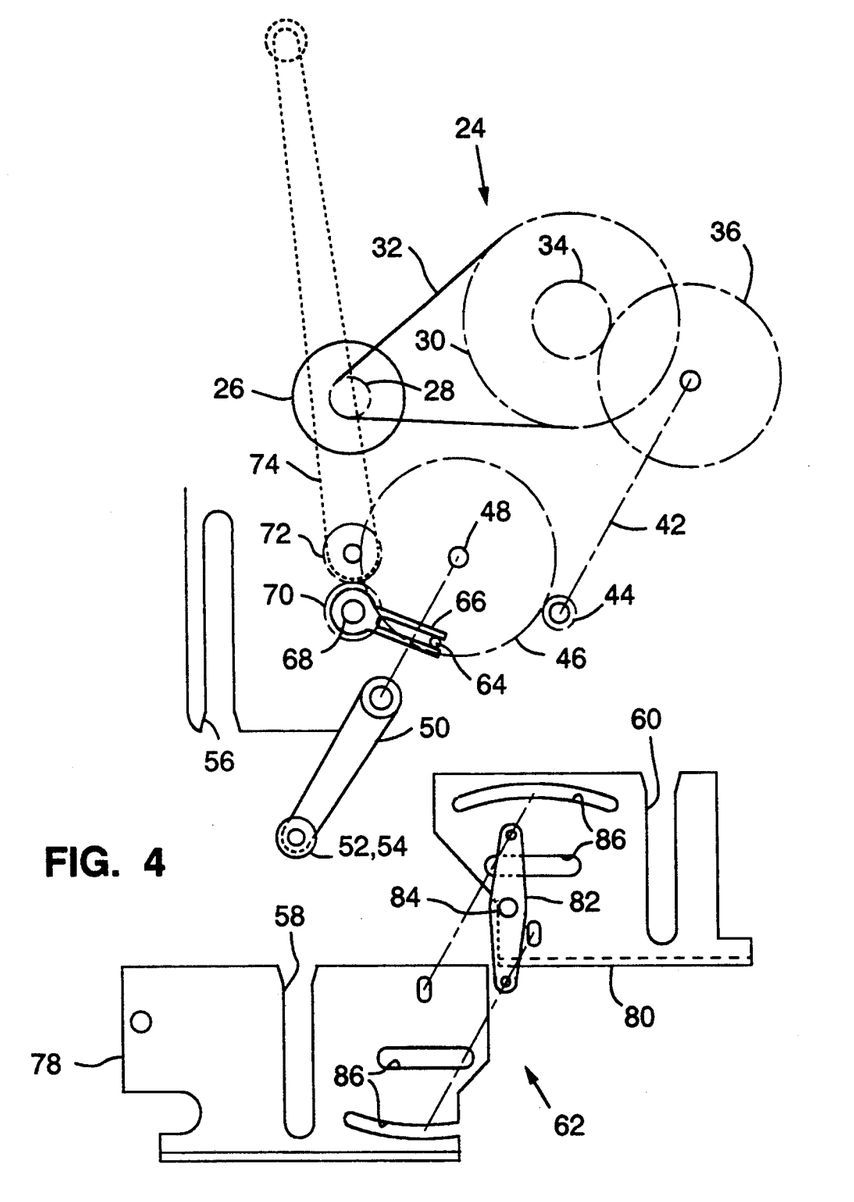
FIG. 4 is an exploded view of a gearing mechanism and scissors mechanism of the present invention.

As shown in FIGS. 2-4, the rotary arm cam mechanism 24 is powered by a rotary electric motor 26 and driven through a step-down gearing mechanism. The motor 26 drives a sprocket 28 mounted on the shaft of the motor, which sprocket in turn drives another sprocket 30 through a belt 32 engaging both sprockets. Sprocket 30 drives a gear 34 mounted on the same shaft 40. Gear 34 in turn meshes with and drives a gear 36, forming a first set of gears. Motor 26 is mounted to a support structure 38 that also supports shafts 40 and 42 that carry sprocket 30 and gear 36, respectively. The sprocket and belt drive and the first set of gears are located on one side of the support structure 38, as best shown in FIGS. 2 and 3. Shaft 42 extends through the support structure 38 and has a gear 44 on the end opposite gear 36. Gear 44 engages gear 46, which in turn rotates a shaft 48 that also carries a cam arm 50 that rotates with gear 46. Since the driving sprocket and gears are all smaller than the associated driven sprocket and gears, the gearing mechanism achieves a three level step-down in gearing.

The rotary arm cam 50 has a "T" shaped end with two cylindrical rollers 52 and 54. One of the rollers 52 engages a slot 56 in the cartridge 22 to move the cartridge back and forth, while the other roller 54 engages two slots 58 and 60 in a scissors mechanism 62 to actuate the disc feed mechanism 18. These operations are described in more detail below.

As best shown in FIG. 4, attached to the side of gear 46 opposite the cam arm 50 is a pin 64 that engages a slotted member 66 that is affixed to a shaft 68 that is rotatably mounted to the support structure 38. Also affixed to shaft 68 is a gear 70 that engages a gear 72 and is used to drive a disc extraction arm 74, which is described in more detail below. The support structure 38 is mounted on a base plate 76 (FIG. 3).

Figure 8:
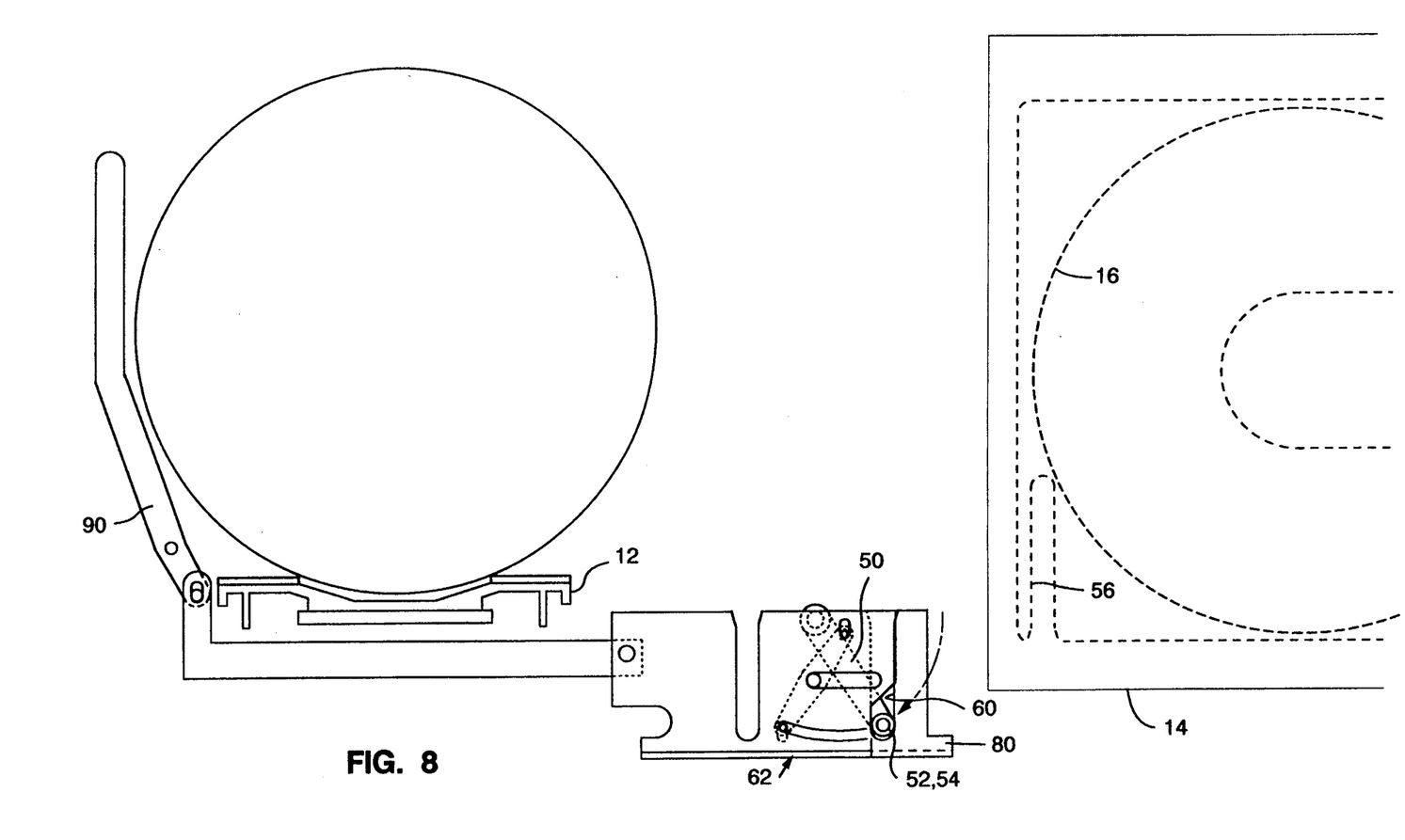
FIG. 8 shows the loading of the cartridge into the disc player.

The rotary arm cam mechanism 24 drives the cam arm 50 through almost a full revolution between a 7 o'clock position (shown, e.g., in FIGS., 1,4, and 5) and a 5 o'clock position (shown in FIG. 8). The precise limits of the rotation of the cam arm 50 are determined by limit switches (not shown).

Figure 5:
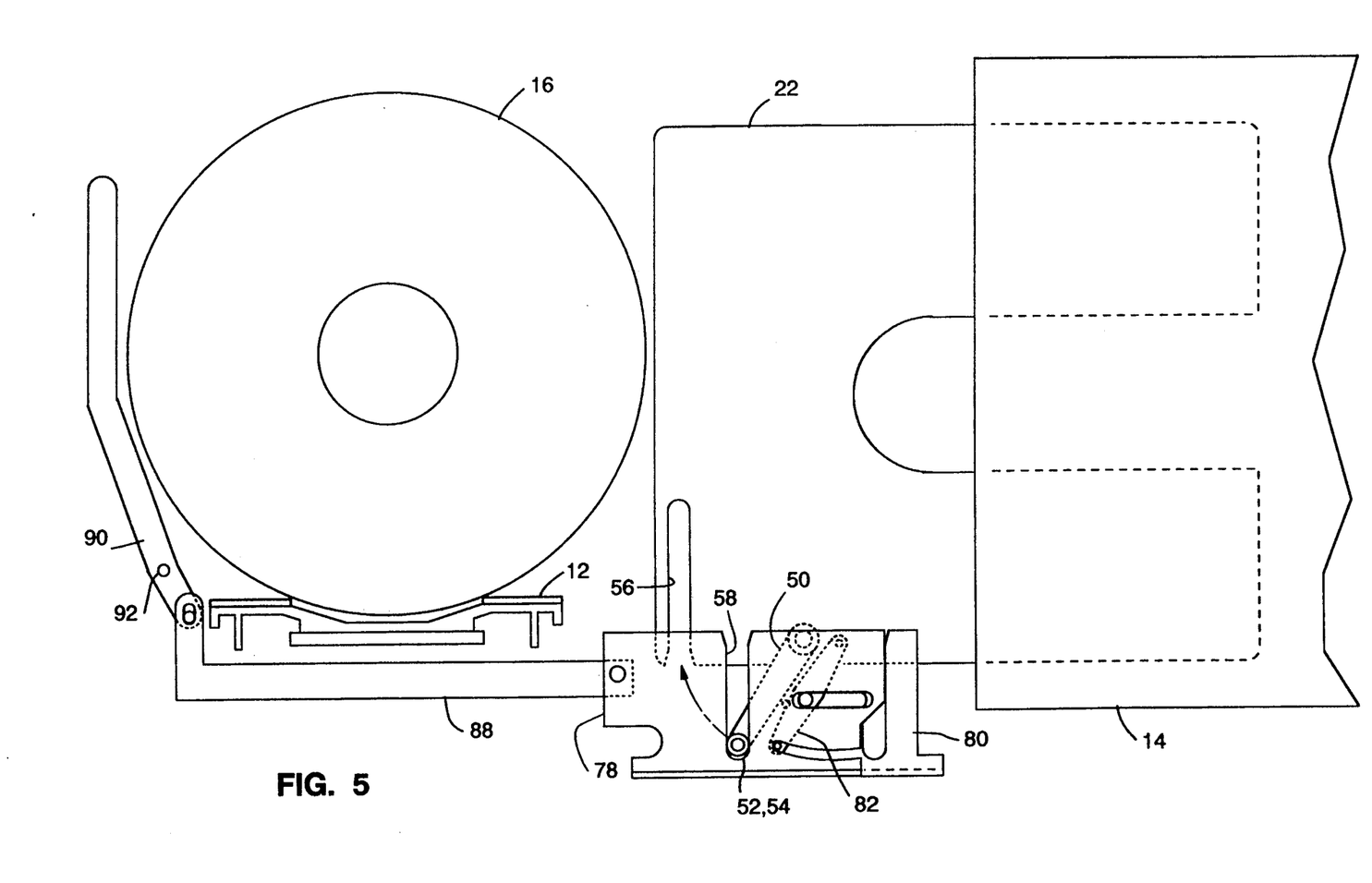
FIG. 5 shows the disc loaded on the storage rack.
Figure 6:
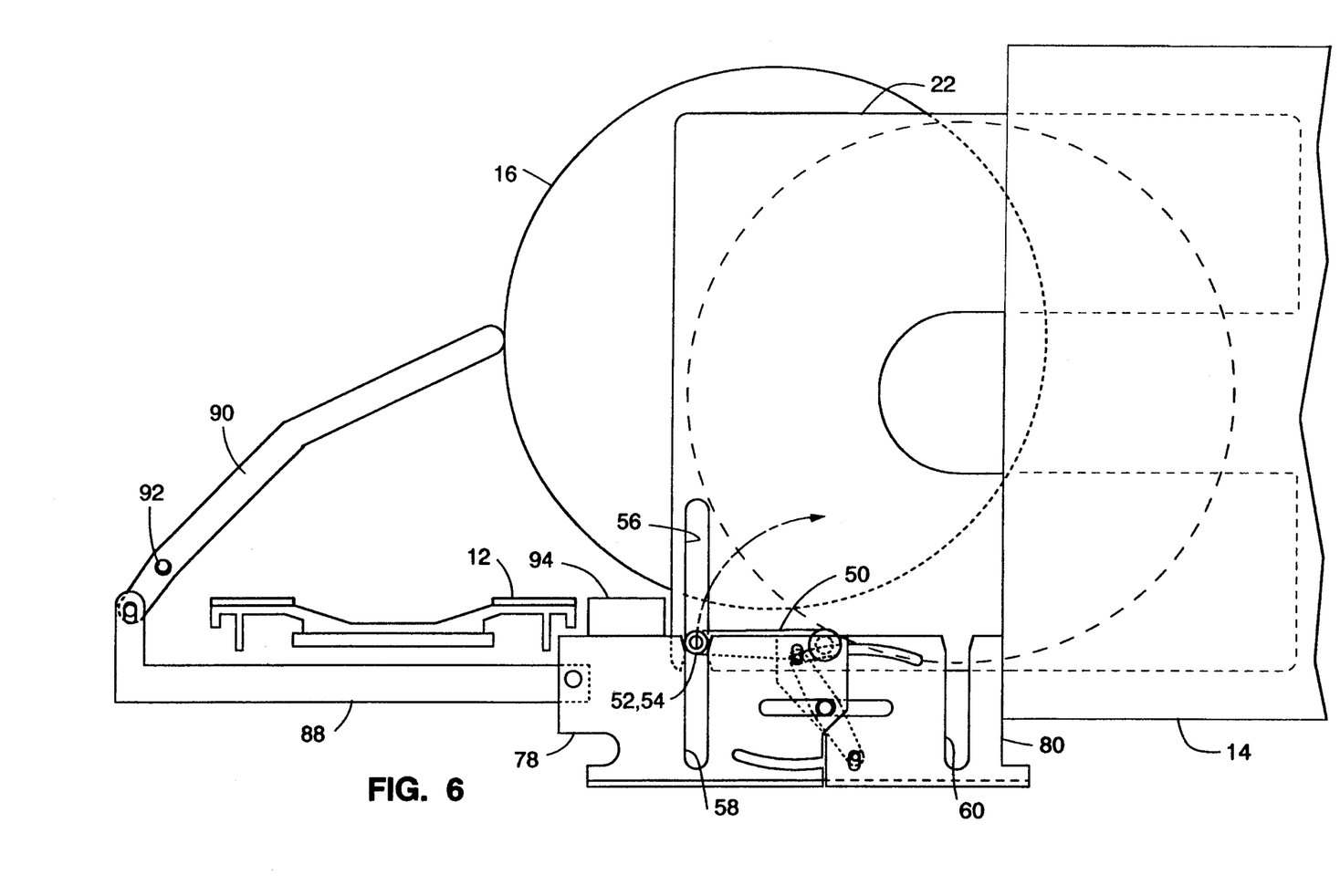
FIG. 6 shows the transfer of the disc from the storage rack to a cartridge.

The scissors mechanism 62, shown in FIGS. 4 and 5, is the means by which the rotary cam actuates the disc feed mechanism 18. The scissors mechanism 62 includes two plates 78 and 80 that are slidably mounted in the support structure 38. The plates 78 and 80 are coupled together with a link 82 that is mounted to the support structure 38 with a shaft 84 about which the link pivots. Each end of the link 82 is coupled to one of the plates 78 and 80, so that when either plate is moved by the roller cam 54 both plates will move. Both plates 78 and 80 include slots 86 that provide clearance for the link 82. The left side of plate 78 is coupled to an actuator arm 88 that is coupled at its other end to a feeder arm 90. The feeder arm 90 is pivotally mounted about a pin 92 and extends upward next to the disc 16, as shown in FIG. 5.

FIGS. 5-8 illustrate the disc feed and cartridge transport mechanisms in operation. FIG. 5 shows a disc 16 on the storage rack 12 in a position where it can be loaded into the cartridge 22. The cartridge 22 is withdrawn from the disc player 14 and its left side is adjacent to the disc 16 and storage rack 12. When the disc handling mechanism 10 is in the state shown in FIG. 5, the storage rack 12 can be moved to bring a selected disc 16 to a position next to the disc handling mechanism. The state of the disc handling mechanism as shown in FIG. 5 is characterized by the cam arm 50 being at a 7 o'clock position and engaging the slot 58 of the left-side scissor plate 78. At this position, the scissors mechanism 62 is closed, with the plates 78 and 80 positioned close together.

Figure 7:
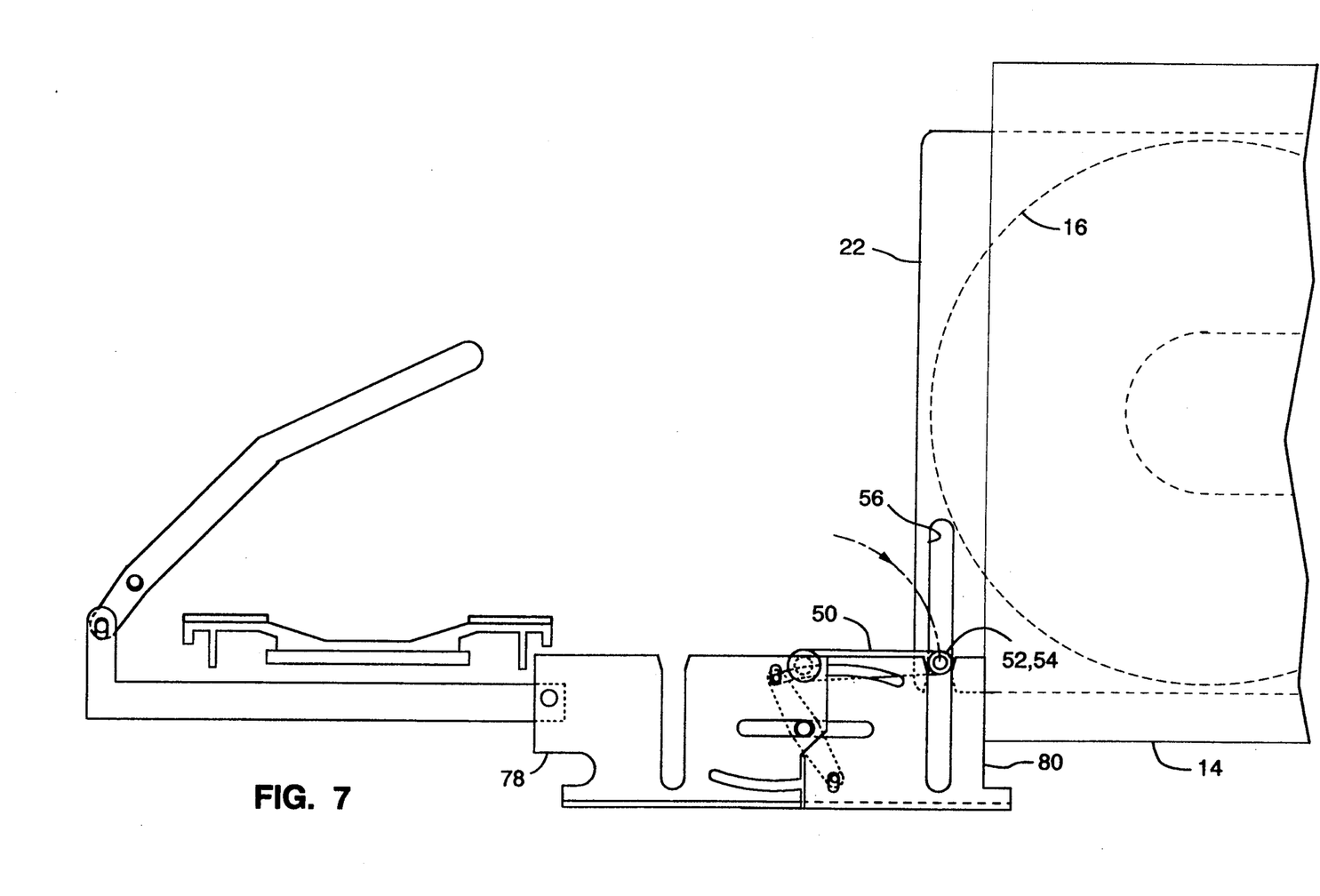
FIG. 7 shows the transfer of the cartridge into the disc player.

Whenever a disc 16 is to be loaded into the disc player 22, the cam arm 50 rotates clockwise from the 7 o'clock position shown in FIG. 5 to the 5 o'clock position shown in FIG. 8. In the portion of the rotation of cam arm 50 from 7 o'clock to 9 o'clock, the roller cam 54 engages the slot 58 of the scissors mechanism and moves it to the left to the position shown in FIG. 6. The leftward movement of plate 78 causes the actuator link 88 to move to the left and the feeder arm 90 to pivot clockwise about the pin 92. The clockwise movement of the feeder arm 90 pushes the disc 16 from the storage rack 12, across a platform 94, and into the cartridge 22. The cartridge 22 has an internal ramp 96 (FIG. 10) that guides the disc into the cartridge. The leftward movement of plate 78 also opens the scissors mechanism, moving the right plate 80 to the right through the action of the link 82, thereby preparing the scissors mechanism for the reentry of the roller cam 54 at the 3 o'clock position as shown in FIG. 7. Thus, the movement of the cam arm 50 from 7 o'clock to 9 o'clock feeds the disc 16 into the cartridge 22.

The next step in loading the disc 16 into the disc player 14 involves transporting the cartridge 22 containing the disc to a position adjacent the disc player. This is accomplished by the cam arm 50 rotating clockwise from the 9 o'clock position shown in FIG. 6 to the 3 o'clock position shown in FIG. 7. During this rotation, the roller cam 52 engages the vertical slot 56 in the cartridge 22 and moves the cartridge to the right. The cartridge 22 is accelerated by the rotating cam arm 50 from the 9 o'clock position to the 12 o'clock position, and is then decelerated from the 12 o'clock position to the 3 o'clock position, assuming a constant rotational velocity of the cam arm.

The final step in loading the disc 16 into the disc player 14 is illustrated in FIG. 8. During this phase, the cam arm 50 rotates clockwise from the 3 o'clock position to the 5 o'clock position, thereby disengaging the roller cam 52 from the slot 56 in the cartridge. The disc player 14 contains an internal mechanism that pulls the cartridge the rest of the way into the player once the cartridge is partially inserted as shown in FIG. 7. The disc player is positioned with respect to the disc handling mechanism so that the cartridge at the FIG. 7 position triggers the player's cartridge feed mechanism. Also during this phase, the roller cam 54 engages slot 60 of the right plate 80 of the scissors mechanism 62 and moves the plate to the left, thereby closing the scissors mechanism and raising the feeder arm 90 to its upright position. With the feeder arm 90 now upright, the storage rack 12 can be repositioned. Preferably, the rotation of the cam arm 50 is continuous from the 7 o'clock position to the 5 o'clock position.

The unloading of the disc 16 from the disc player 14 to the storage rack 12 is accomplished by reversing the rotation of the cam arm 50. A counter-clockwise rotation of the cam arm from the 5 o'clock position to the 7 o'clock position first opens the scissors mechanism, then extracts the cartridge 22 from the disc player and moves it over to the storage rack, and then unloads the disc from the cartridge onto the storage rack.

Figure 9:
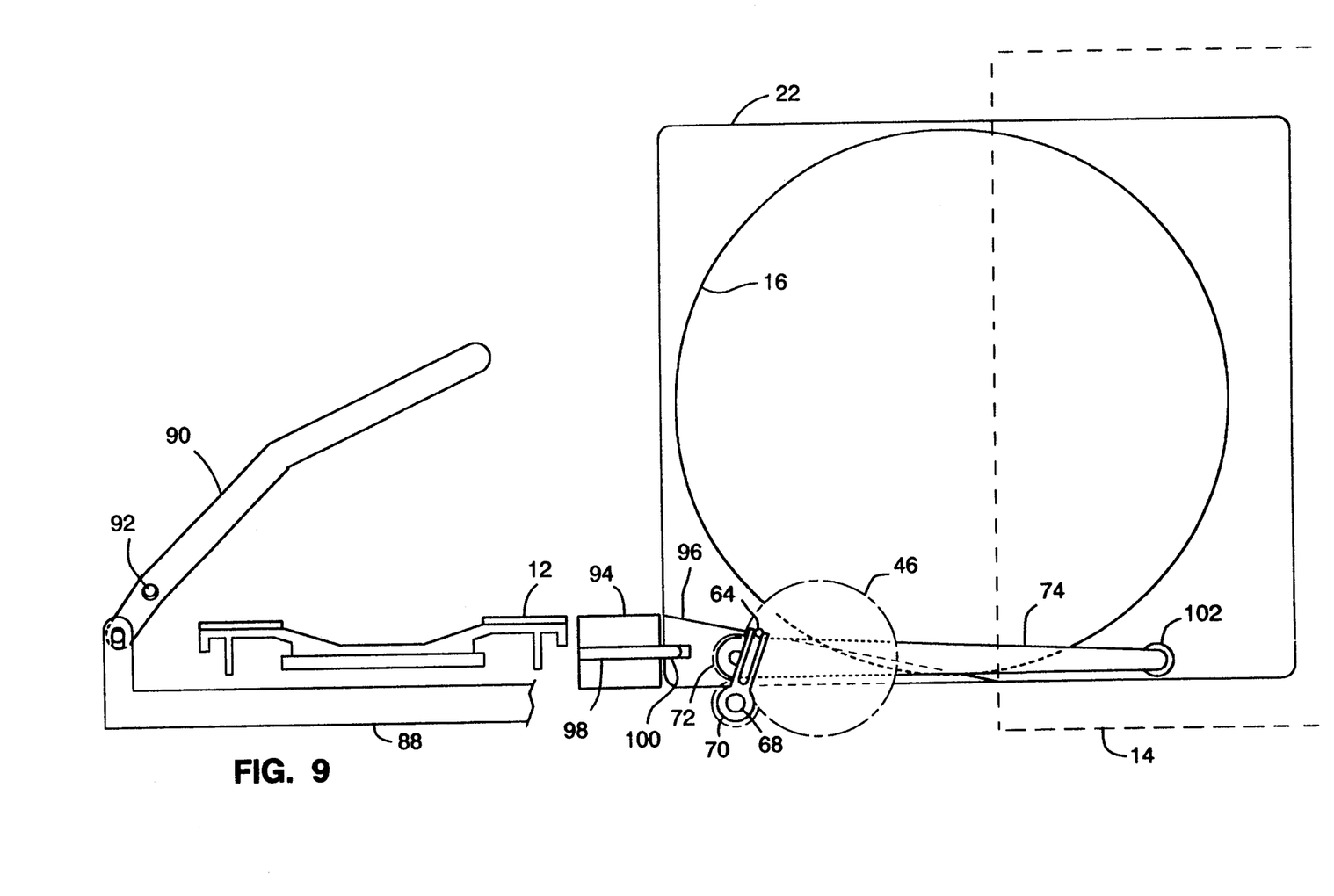
FIG. 9 shows the disc positioned within the cartridge.
Figure 10:
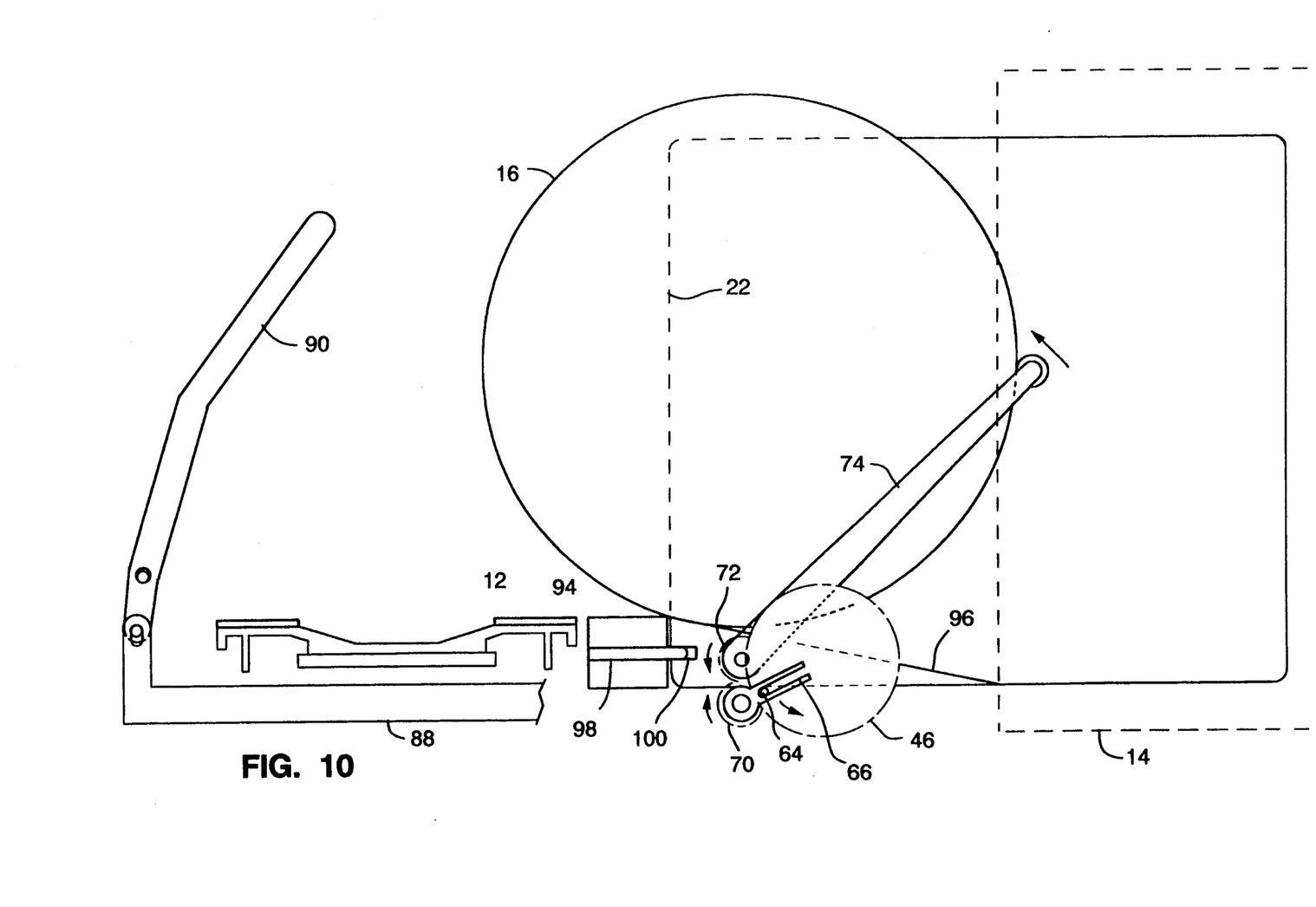
FIG. 10 shows the disc partially extracted from the cartridge.
Figure 11:
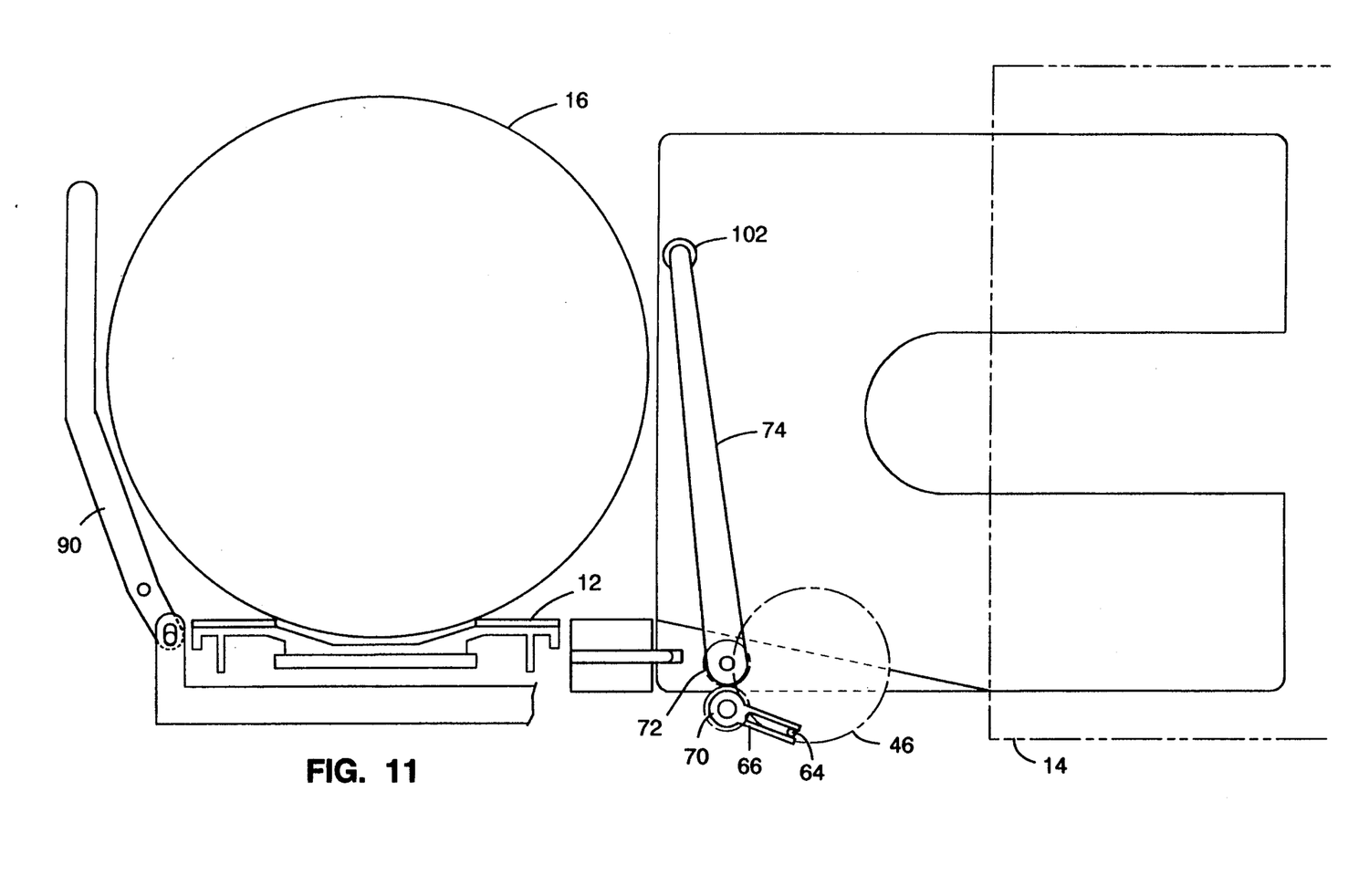
FIG. 11 shows the disc fully extracted from the cartridge and loaded onto the storage rack.

The sequential operation of the disc extraction mechanism 20 that unloads the disc from the cartridge 22 to the storage rack 12 is shown in FIGS. 9-11. When the cam arm has rotated counter-clockwise to the 9 o'clock position, the cartridge 22 is positioned as shown in FIG. 9. The gear 72 at the pivot end of the extraction arm 74 is now engaged with the gear 70. A pin 98 mates with a socket or hole 100 in the cartridge to ensure that the gears 70 and 72 remain engaged. As the gear 46 (and cam arm 50) continues to rotate counter-clockwise, the pin 64 engages the slotted member 66, which turns the gears 70 and 72, thereby lifting the extraction arm 74. A roller 102 at the end of the extraction arm 74 engages the edge of the disc 16 and lifts it up the inclined ramp 96. This is illustrated in FIG. 10. As the gear 46 (and cam arm 50) continue to rotate to the 5 o'clock position, the extraction arm 74 has been raised to an upright position, shown in FIG. 11, thereby rolling the disc up the ramp 96, across the platform 94 and onto the storage rack 12. During this sequence, the feeder arm 90 is also being raised to an upright position.

From the above description, it will be apparent that the invention disclosed herein provides a novel and advantageous apparatus for an automatic disc changer apparatus for selecting and loading any one of a plurality of data discs onto the spindle of a data input/output device. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A disc handling mechanism for transferring one of a plurality of discs between a storage rack and a disc player, said disc handling mechanism comprising:

a cartridge insertable into a disc player and movable between a first position adjacent the storage rack and a second position adjacent the disc player;

disc feed means for transferring a disc from the storage rack to the cartridge at the first position;

cartridge transfer means for engaging said cartridge and moving the cartridge between the first position and the second position; and disc extraction means for transferring the disc from the cartridge at the first position to the storage rack.

2. A disc handling mechanism as recited in claim 1 further comprising a rotary arm cam operable for rotating intermittently in alternating directions, wherein the rotary arm cam intermittently actuates the disc feed means, the cartridge transfer means, and the disc extraction means.

3. A disc handling mechanism as recited in claim 2 wherein the disc handling mechanism includes means for transferring the disc from the storage rack to the disc player by rotating the rotary arm cam in a forward direction, wherein the rotary arm cam as it rotates actuates the disc feed means and the cartridge transfer means.

4. A disc handling mechanism as recited in claim 2 wherein the disc handling mechanism includes means for transferring the disc from the disc player to the storage rack by rotating the rotary arm cam in a reverse direction, wherein the rotary arm cam as it rotates actuates the cartridge transfer means and the disc extraction means.

5. A disc handling mechanism as recited in claim 2 wherein the disc feed means includes means engaging the rotary arm cam for rolling the disc from the storage rack to the cartridge.

6. A disc handling mechanism as recited in claim 2 wherein the cartridge transfer means includes means engaging the rotary arm cam for moving the cartridge between the first and second positions.

7. A disc handling mechanism as recited in claim 2 wherein the disc extraction means includes means engaging the rotary arm cam for rolling the disc from the cartridge to the storage rack.

8. A disc handling mechanism as recited in claim 1 wherein the disc feed means includes means for pushing the disc out of the storage rack and partially into the cartridge, and wherein the cartridge includes an inclined plane for the disc to roll downward into the cartridge.

9. A disc handling mechanism as recited in claim 8 wherein the means for pushing the disc includes a feeder arm that contacts the disc and a scissors mechanism linked to the feeder arm, wherein the scissors mechanism is opened and closed by a rotary arm cam that rotates intermittently in alternating directions.

10. A disc handling mechanism as recited in claim 1 wherein the cartridge transfer means includes a slot in the cartridge and includes a rotary arm cam that rotates intermittently in alternating directions and engages the slot in the cartridge to move the cartridge between the first position and the second position.

11. A disc handling mechanism as recited in claim 1 wherein the disc extraction means includes a disc extraction arm housed within the cartridge and pivoted at one end thereof, and includes means operative when the cartridge is at the first position for raising the disc extraction arm and thereby rolling the disc out of the cartridge and onto the storage rack.

12. A disc handling mechanism as recited in claim 11 wherein the disc extraction arm includes a first gear affixed to the pivoted end thereof, and wherein the means for raising the disc extraction arm includes a second gear engaged by the first gear when the cartridge is at the first position and includes means associated with a rotary arm cam that rotates intermittently in alternating directions for rotating the second gear to intermittently raise and lower the disc extraction arm.

13. A disc handling mechanism for transferring a disc between a storage rack and a disc player, said disc handling mechanism comprising:
- a cartridge insertable into a disk player and movable between a first position adjacent the storage rack and a second position adjacent the disc player, said cartridge having a slot;
- a rotary arm cam operable for intermittent rotation in alternating directions that engages the slot of the cartridge and moves the cartridge between the first and second positions as the cam rotates;
- a disc feed mechanism engaged by the rotary arm cam for transferring a disc from the storage rack to the cartridge at the first position as the rotary arm cam rotates; and
- a disc extraction mechanism engaged by the rotary arm cam for transferring the disc from the cartridge at the first position to the storage rack as the rotary arm cam rotates.

14. A disc handling mechanism for transferring a disc between a storage rack and a disc player, said disc handling mechanism comprising:
- a rotary arm cam operable for intermittent rotation in alternating directions;
- disc feed means for transferring the disc from the storage rack to a cartridge, wherein the rotary arm cam engages the disc feed means during a first portion of its rotation to move the disc from the storage rack to the cartridge at a first position adjacent the storage rack;
- the cartridge movable between a first position adjacent the storage rack and a second position adjacent the disc player, wherein the rotary arm cam engages the cartridge during a second portion of its rotation to move the cartridge between the first and second positions; and
- disc extraction means for transferring the disc from the cartridge at the first position to the storage rack as the rotary arm cam rotates, wherein the rotary arm cam engages the disc extraction means during a third portion of its rotation to move the disc from the cartridge at the first position to the storage rack.

15. A disc handling mechanism for transferring a disc between a storage rack and a disc player, said disc handling mechanism comprising:
- a rotary arm cam operable for intermittent rotation in alternating directions;
- disc feed means for transferring the disc from the storage rack to a cartridge, wherein the disc feed means includes a pivotally-mounted feeder arm that contacts the disc and a scissors mechanism linked to the feeder arm, wherein the rotary arm cam engages the scissors mechanism during a portion of the rotary arm cam rotation in a forward direction to pivot the feeder arm to roll the disc from the storage rack to the cartridge at a first position adjacent the storage rack and engages the scissors mechanism during another portion of the rotary arm cam rotation in the forward direction to return the feeder arm to its original position;
- the cartridge movable between a first position adjacent the storage rack and a second position adjacent a disc player, wherein the cartridge includes a slot oriented transverse to the direction of movement of the cartridge, wherein the rotary arm cam engages the slot in the cartridge during a portion of its rotation in the forward direction to move the cartridge from the first position to the second position, and wherein the rotary arm cam engages the slot in the cartridge during a portion of its rotation in a reverse direction to move the cartridge from the second position back to the first position; and
- disc extraction means for transferring the disc between the cartridge at the first position and the storage rack, wherein the disc extraction means includes a disc extraction arm pivotally-mounted within the cartridge and a first gear affixed to the pivoted end of the disc extraction arm, wherein the disc extraction means further includes a second gear engaged by the first gear when the cartridge is at the first position, and wherein the rotary arm cam engages and rotates the second gear during a portion of its rotation in the forward direction to lower the disc extraction arm and guide the disc into the cartridge, and wherein the rotary arm cam engages and rotates the second gear during a portion of its rotation in the reverse direction to raise the disc extraction arm and roll the disc out of the cartridge and onto the storage rack.

16. A disc handling mechanism for transferring a disc between a storage rack and a disc player, said disc handling mechanism comprising:
- a cartridge movable between a first position adjacent the storage rack and a second position adjacent the disc player, said cartridge having a slot and an inclined plane;
- a rotary arm cam operable for intermittent rotation in alternating directions, wherein the rotary arm cam engages the slot of the cartridge and moves the cartridge between the first and second positions as the rotary arm cam rotates;
- a disc feed mechanism engaged by the rotary arm cam for rolling the disc from the storage rack to the cartridge at the first position as the rotary arm cam rotates, wherein the disc feed mechanism includes a feeder arm that contacts the disc and a scissors mechanism linked to the feeder arm, wherein the scissors mechanism is engaged by the rotary arm cam for opening and closing the scissors mechanism for respectively lowering and raising the feeder arm, and
- a disc extraction mechanism engaged by the rotary arm cam for rolling the disc from the cartridge at the first position to the storage rack as the rotary arm cam rotates, wherein the disc extraction mechanism includes an arm housed within the cartridge and pivoted at one end thereof, and includes means engaged by the rotary arm cam when the cartridge is at the first position and operative for raising the disc extraction arm and thereby rolling the disc out of the cartridge and onto the storage rack.

* * * * *